United States Patent [19]

Wanlass et al.

[11] 4,418,498
[45] Dec. 6, 1983

[54] WINDOW GUIDANCE ARRANGEMENT

[75] Inventors: Bert R. Wanlass, Warren; James R. Drouillard, Rochester, both of Mich.

[73] Assignee: General Motors Corporation, Detroit, Mich.

[21] Appl. No.: 342,832

[22] Filed: Jan. 26, 1982

[51] Int. Cl.$^3$ ............................................. E05D 13/02
[52] U.S. Cl. ....................................... 49/425; 49/348; 49/375; 308/6 R
[58] Field of Search ................. 49/425, 348, 502, 374, 49/375, 428; 308/6 R, 3 B

[56] References Cited

U.S. PATENT DOCUMENTS

| | | | |
|---|---|---|---|
| 2,024,772 | 12/1935 | Levan | 49/425 X |
| 2,061,279 | 11/1936 | Kurtzon | 308/6 R |
| 2,236,448 | 3/1941 | Roethel | 49/375 |
| 2,822,215 | 2/1958 | Blanton et al. | 49/425 |
| 3,157,441 | 11/1964 | Pickles | 308/6 R X |
| 3,385,000 | 5/1968 | Sturtevant et al. | 49/374 X |
| 3,703,053 | 11/1972 | De Rees et al. | 49/375 X |
| 4,240,227 | 12/1980 | Hasler et al. | 49/348 |
| 4,297,913 | 11/1981 | Garbo | 308/6 R X |

FOREIGN PATENT DOCUMENTS 2840811 4/1980 Fed. Rep. of Germany.

*Primary Examiner*—Philip C. Kannan
*Attorney, Agent, or Firm*—Charles E. Leahy

[57] ABSTRACT

A carrier member mounted on a door window is positioned between the first and second opposed facing spaced apart legs of a door mounted track. The carrier member has an axially extending cylindrical bore communicating between the track legs. First and second bearing balls are mounted within the cylindrical bore and roll against one another and respectively against the first and second track legs to provide low friction precision guided movement of the window between the open and closed positions. Tracks are preferably provided at both the front and rear of the window. One of the tracks extends vertically through the window opening. First and second carrier members and associated rolling balls are mounted on the window in vertically spaced relation and roll along semi-cylindrical grooves extending vertically along the track legs to define the path of rolling movement and support the window against pitching movement and against fore and aft movement relative the door.

3 Claims, 7 Drawing Figures

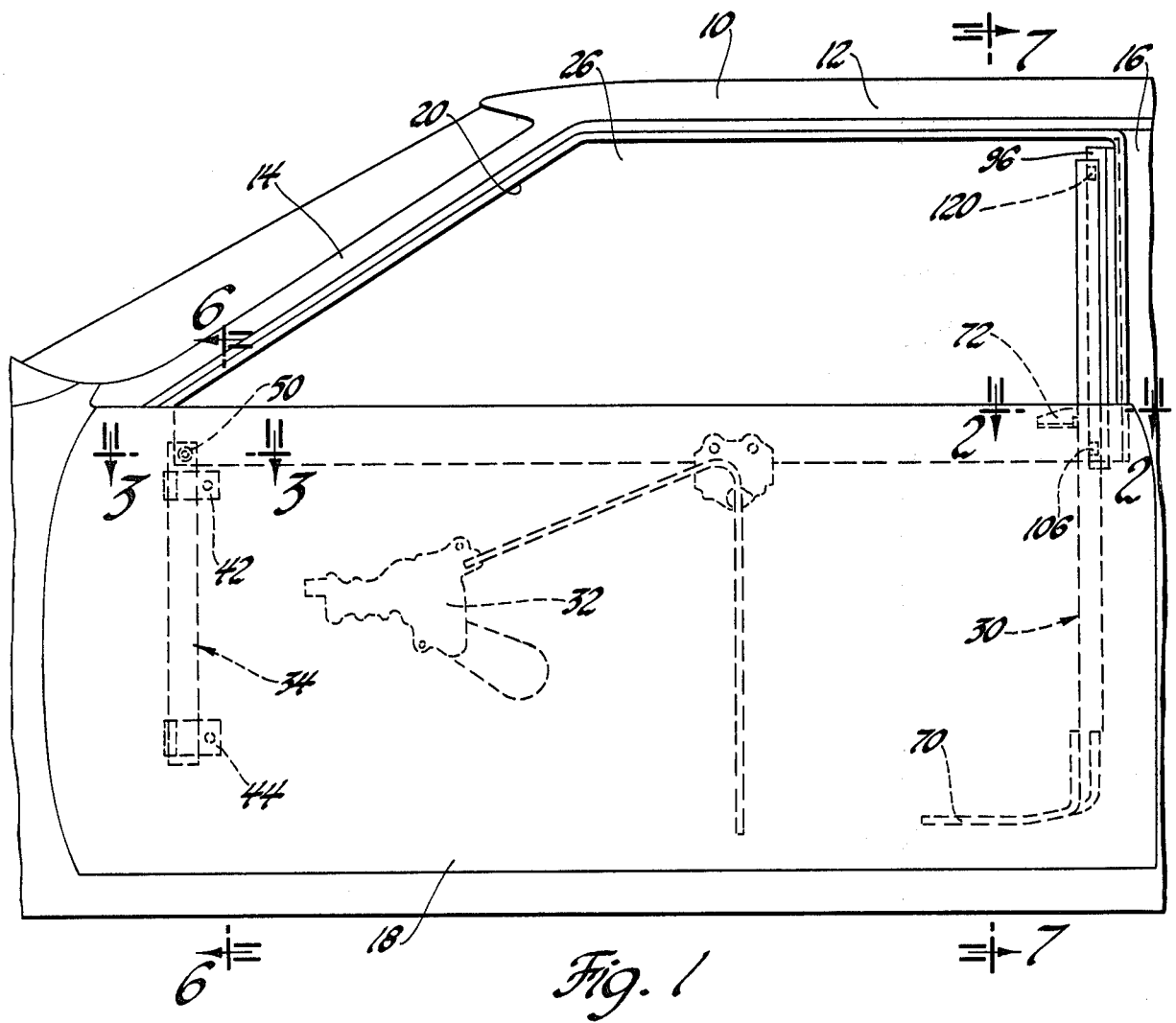

U.S. Patent  Dec. 6, 1983  Sheet 2 of 2  4,418,498
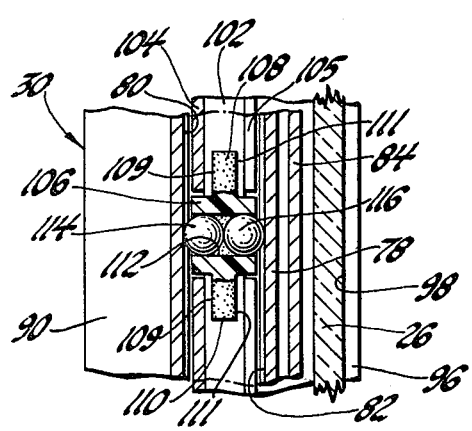
Fig. 5
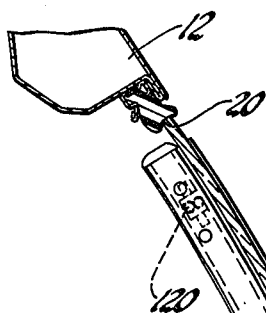
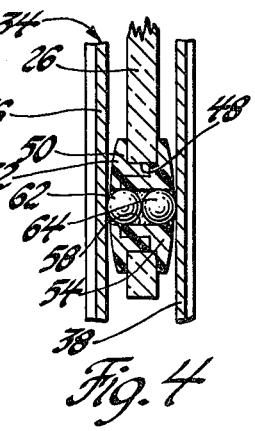
Fig. 4
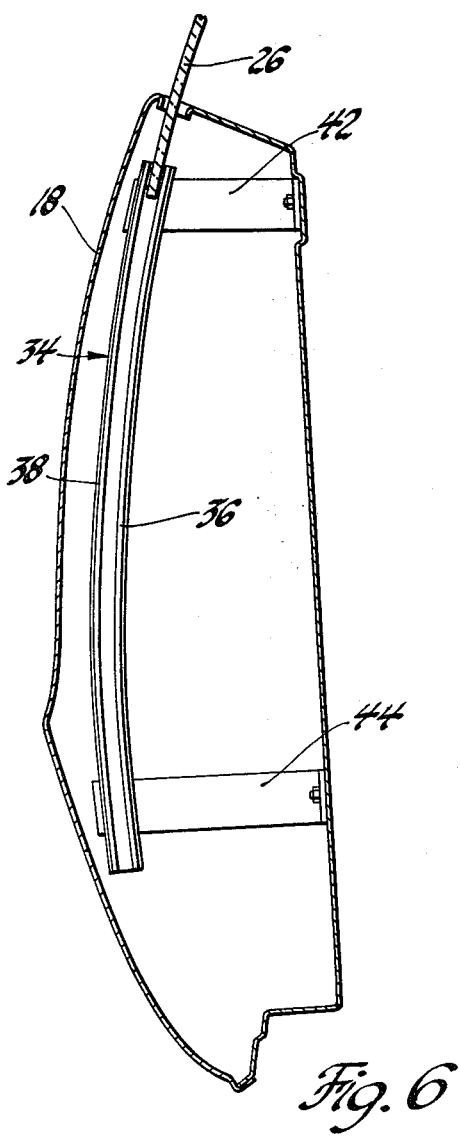
Fig. 6
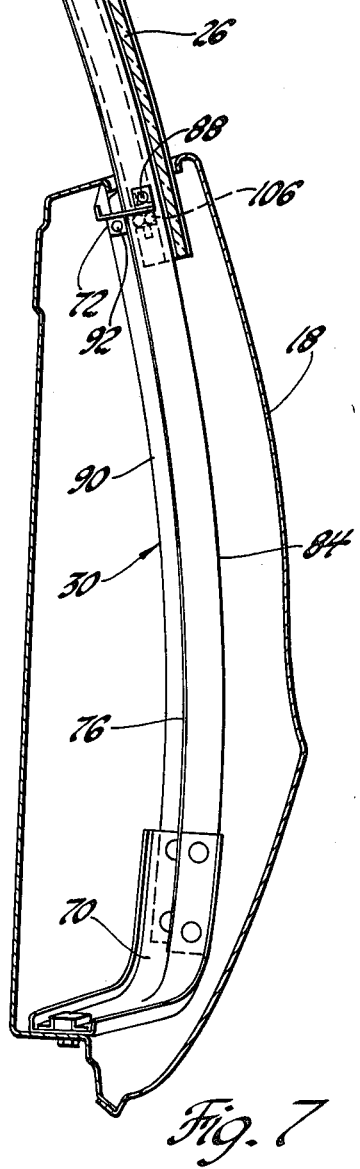
Fig. 7

WINDOW GUIDANCE ARRANGEMENT

The invention relates to an arrangement for guiding movement of a door window between open and closed positions and more particularly provides ball bearings carried by the window and rolling on one another in tracks mounted on the door.

BACKGROUND OF THE INVENTION

It is well known in motor vehicles to mount a glass window panel on a vehicle door for guided movement between a lowered open position and a raised closed position. In hardtop vehicles the door does not have a frame surrounding the window opening. In such frameless doors, the window has its lower front and rear corners movably mounted by front and rear tracks mounted within the door to guide the movement of the window between raised and lowered positions by a window regulator. In those vehicles in which the door provides a window frame around the window opening, at least one of the front and rear tracks is provided by the window frame so that the window can be supported in the track at both its upper and lower corners to provide a more stable guided movement of the glass between the open and closed positions.

The present invention relates to the provision of an improved low friction guiding connection between the window and the track.

SUMMARY OF THE INVENTION

According to the present invention, a channel track mounted on the door has opposed facing spaced apart legs. A carrier mounted on the window is positioned between these channel legs and has an axially extending cylindrical bore communicating between the track legs. First and second bearing balls are mounted within the cylindrical bore for respective rolling contact with the first and second track legs and with one another so that upon movement of the window between raised and lowered positions the balls roll against one another and against the first and second track legs to provide low friction precision guided movement of the window between the open and closed positions. In the preferred embodiment of the invention, a front track extends vertically within the door at the forward edge of the window and a rear track is mounted on the door at the rear edge and extends into the window opening. A front carrier member is mounted on the lower front corner of the window and carries first and second balls which roll respectively upon one another and upon first and second opposed facing spaced apart legs of the front track. First and second rear carrier members are mounted on the upper and lower rear corners of the window and respectively carry first and second balls which roll upon one another and upon the opposed facing spaced apart legs of the rear track. The opposed facing legs of the rear track members have semi-cylindrical grooves extending vertically therealong and define the path or rolling movement by the first and second balls carried by the rear carrier members to suitably support the window against pitching movement and against fore and aft movement relative to the door.

One object, feature and advantage of the invention resides in the provision of carrier members mounted on a window and adapted to mount first and second rolling members which roll upon one another and upon opposed facing spaced apart legs of a track mounted within the door to provide low friction guided movement of the window between lowered and raised positions.

Another object, feature and advantage of the invention resides in the provision of first and second ball members mounted on a window by a carrier member and adapted for rolling movement within vertically extending semi-cylindrical grooves provided in the opposed facing space apart legs of a track to mount the window for low friction movement between raised and lowered positions and to support the window against fore and aft movement relative the door.

Still a further object, feature and advantage of the invention resides in the provision of window guidance track having opposed facing spaced apart legs extending parallel with the window and having vertical extending semi-cylindrical grooves therein adapted for rolling contact by first and second pairs of rolling ball members carried by the window at vertical spaced locations thereon to restrain the window against pitching movement about a transverse axis during movement of the window between open and closed positions.

BRIEF DESCRIPTION OF THE DRAWINGS

These and other objects, features and advantages of the invention will become apparent upon consideration of the specification and the appended drawings in which:

FIG. 1 is a side elevation view of a vehicle body door having a window mounted for guided movement between a lowered open position and a raised closed position;

FIG. 2 is a sectional view taken in the direction of arrows 2—2 of FIG. 1 and showing the guiding connection between the movable window and a track mounted on the rear edge of the door;

FIG. 3 is a sectional view taken in the direction of arrows 3—3 of FIG. 1 and showing the guiding connection between the front edge of the window and a front track mounted within the door;

FIG. 4 is a sectional view taken in the direction of arrows 4—4 of FIG. 3;

FIG. 5 is a sectional view taken in the direction of arrows 5—5 of FIG. 2;

FIG. 6 is a sectional view taken in the direction of arrows 6—6 of FIG. 1 and showing the front track; and FIG. 7 is a sectional view taken in the direction of arrows 7—7 of FIG. 1 and showing the rear track.

DESCRIPTION OF THE PREFERRED EMBODIMENT

Referring to FIG. 1 there is shown a vehicle body 10 having a roof rail 12, a windshield pillar 14, a B pillar 16, and a door 18 which cooperate to define a window opening 20. The door 18 is conventionally mounted by hinges which permit pivotal movement of the door between open and closed positions.

A transparent glass or plastic window panel 26 is mounted on the door by a front track 34 and a rear track 30 for guided movement between a raised and closed position shown in FIG. 1 and a lowered open position. A tape drive window regulator mechanism 32 is mounted within the door to regulate the position of the window 26.

Referring to FIGS. 3, 4 and 6, it is seen that the front track 34 is a roll formed C-shaped channel and includes first and second opposed facing spaced apart legs 36 and 38. Track 34 is mounted within the door by a top bracket 42 and a bottom bracket 44 seen in FIGS. 1 and 6.

As best seen in FIG. 3, the window 26 is positioned between the track legs 36 and 38 and has a circular aperture 48 which receives a ball carrier member 50 defined by injection molded plastic segments 52 and 54. The plastic segments 52 and 54 are inserted into the aperture 48 from opposite sides of the window 26 and have axially extending interfitted walls which define an axially extending bore 58 which communicates between the track legs 36 and 38. A first bearing ball 62 and a second bearing ball 64 are mounted in the bore 58 and contact with each other and also contact respectively with the first and second legs 36 and 38 of the track 34. The bearing balls 62 and 64 are sized relative the track 34 so that the balls spread the track legs 36 and 38 slightly to provide a preloaded condition which assures a rattle-free connection.

Referring to FIG. 2 it is seen that the rear track 30 is also a roll formed channel. The track 30 has a height substantially twice the height of the window opening so that the lower half of the track is mounted within the door by a lower mounting bracket 70 and an upper mounting bracket 72. The upper half of the track 30 extends into the window opening at the rear edge thereof. As best seen in FIG. 2, the track 30 includes opposed facing spaced apart legs 76 and 78 which respectively have vertically extending semi-cylindrical grooves 80 and 82. The leg 78 is retrorsely bent from the outer end of a wall 84 so that the wall 84 overlies and conceals the potential unsightliness of the leg 78 caused by the metal distortion to form the groove 82. The base wall of the track 30 is attached to the upper bracket 72 by a rivet 88. The track 30 also has a lateral tab 90 which is connected to the mounting bracket 72 by a rivet 92.

Referring to FIGS. 1 and 2, an extruded frame 96 extends vertically along the rear edge of the window 26 and has a recess 98 which receives the rear edge of the glass panel. Referring to FIG. 2, it is seen that the frame 96 includes a laterally offset leg 102 which projects into the space between the track legs 76 and 78. The end of the offset leg 102 has an integral socket 104 which extends continuously along the length of the frame and has a slot 105 which opens outwardly toward the window. As best seen in FIG. 5, a segment of the socket 104 is cut away to receive a molded plastic ball carrier member 106. The ball carrier member 106 has trunion shafts 108 and 110 which respectively extend upward and downward into the socket 104 of the frame 96. The trunnion shafts have flats 109 and 111 which permit the shafts to enter through the slot 105 when the carrier 106 is rotated 90 degrees from its normal position of FIG. 1. The ball carrier 106 has an axially extending bore 112 which communicates with the grooves 80 and 82 of the track legs 76 and 78. First and second bearing balls 114 and 116 are mounted within the bore 112. During movement of the window 26 between the raised and lowered positions, the bearing balls 114 and 116 roll against one another and within the grooves 80 and 82.

Referring again to FIG. 1, it will be understood that an upper ball carrier 120 and associated bearing balls are provided at the upper rear corner of the window 26 and ride within the rear track 30 above the lower ball carrier 106. The single ball carrier 50 connecting the front end of the glass 26 with front track 34 and the lower ball carriers 106 and the upper ball carrier 120 connecting the rear edge of the glass with the rear track 30 will cooperate to accurately define a lateral positioning of the window in the raised position, the lowered position, or in an intermediate position. Furthermore, it will be understood that the seating of the bearing balls of the rear lower and upper ball carrier 106 and 120 within the vertical extending grooves 80 and 82 of the rear track 30 will establish the fore and aft position of window 26 and will also prevent pitching movement of the window 26 about a transverse axis.

While the invention has been disclosed herein primarily in terms of the specific embodiment shown in the drawings, it is not intended to be limited thereto but rather only to the extent set forth in the appended claims. It will be understood that the invention may be conveniently employed in a vehicle door of the type having a frame which entirely surrounds the window opening. In such a vehicle installation the track is conveniently incorporated in the window frame of the door. Furthermore, it will be understood that rollers or other suitable rolling members may be advantageously employed instead of bearing balls. Also, the locations of the front and rear tracks can be reversed and either or both of the tracks can have the vertically extending grooves for guiding the rolling movement of the balls.

The embodiments of the invention in which an exclusive property or privilege is claimed are defined as follows:

1. A window guide mounting a window on a vehicle door for guided movement between a lowered open position and a raised closed position comprising:
   a channel track mounted on the door and having first and second opposed facing spaced apart legs having semi-cylindrical opposed facing grooves extending vertically therealong;
   a carrier positioned between the channel legs, said carrier having an axial extending bore communicating between the channel legs;
   trunnion means mounting the carrier on the window, said trunnion means enabling movement of the carrier relative to the channel track to align the bore with the grooves; and
   first and second bearing balls mounted within the bore, said bearing balls being in respective captured rolling contact within the grooves of the first and second channel legs and in rolling contact with one another whereby upon movement of the window between the lowered open and raised closed positions the bearing balls roll against one another and against the first and second channel legs respectively in rolling contact therewith to provide low friction guided movement of the window between the lowered open and raised closed positions and restrain the window against fore and aft movement.

2. A window guide mounting a window on a vehicle door for guided movement between a lowered open position and a raised closed position comprising:
   a channel track mounted on the door and having first and second opposed facing spaced apart legs having semi-cylindrical opposed facing grooves extending vertically therealong;
   first and second carriers positioned between the track legs, each carrier having an axial extending cylindrical bore communicating between the track legs;
   trunnion means mounting each of the first and second carriers on the window to enable rotary movement of the carrier to align the cylindrical bore with the grooves; and first and second bearing balls mounted within the cylindrical bore of each carrier; said bearing balls being in respective captured rolling contact within the grooves of the first and second track legs and in rolling contact with one another whereby upon movement of the window between the lowered open and raised closed positions the bearing balls roll against one another and against the first and second channel legs respectively in rolling contact therewith to provide low friction guided movement of the window between the lowered open and raised closed positions and restrain the window against pitching movement and against fore and aft movement.

3. A window guide for mounting a window on a vehicle door for movement between a lowered open and a raised closed position comprising:

a front track extending vertically within the door at the forward edge thereof and having first and second opposed facing spaced apart legs;

a rear track mounted on the door at the rear edge thereof, said rear track having opposed facing spaced apart legs and having an overall length of substantially twice the height of the window opening and having half such height extending within the door and the other half extending into the window opening;

a front carrier member mounted on the lower front corner of the window and positioned between the front track legs;

first and second rear carrier members between the rear track legs;

first and second trunnion means respectively mounting said first and second rear carrier members on the upper and lower rear corners of the window to enable rotary movement of the carrier members relative to the rear track;

each of said front carrier member and said rear carrier members having axial extending cylindrical bores communicating between the track legs;

first and second ball members mounted respectively within each of the bores of the carrier members and adapted to roll upon the track legs and upon one another during movement of the window between the lowered opened and raised closed positions of the window; and the opposed facing legs of the rear track member having semi-cylindrical grooves extending vertically therealong and co-acting respectively with the first and second ball members carried by the rear carrier members to suitably fix the window against pitching movement and fore and aft movement relative the door.

* * * * *